Dec. 24, 1968  J. C. STERNBERG  3,418,514
ELECTRICAL DISCHARGE DETECTORS FOR GAS CHROMATOGRAPHY
Filed May 31, 1966

JAMES C. STERNBERG
INVENTOR.

BY
ATTORNEY

United States Patent Office 3,418,514
Patented Dec. 24, 1968

3,418,514
ELECTRICAL DISCHARGE DETECTORS
FOR GAS CHROMATOGRAPHY
James C. Sternberg, Fullerton, Calif., assignor to Beckman Instruments, Inc., a corporation of California
Filed May 31, 1966, Ser. No. 553,897
8 Claims. (Cl. 313—231)

ABSTRACT OF THE DISCLOSURE

A detector for gas chromatography having a straight, minimum volume, flow through detection chamber and a discharge chamber at an angle thereto which may alternatively be fitted with a pair of electrodes for generating electrons positioned away from and axially aligned with the junction of the discharge and detection chambers or a pair of electrodes for generating photons positioned near and at an angle to the axis of the junction. A restriction is provided at the junction to prevent backflow into the detector discharge chamber.

---

Figure 1:
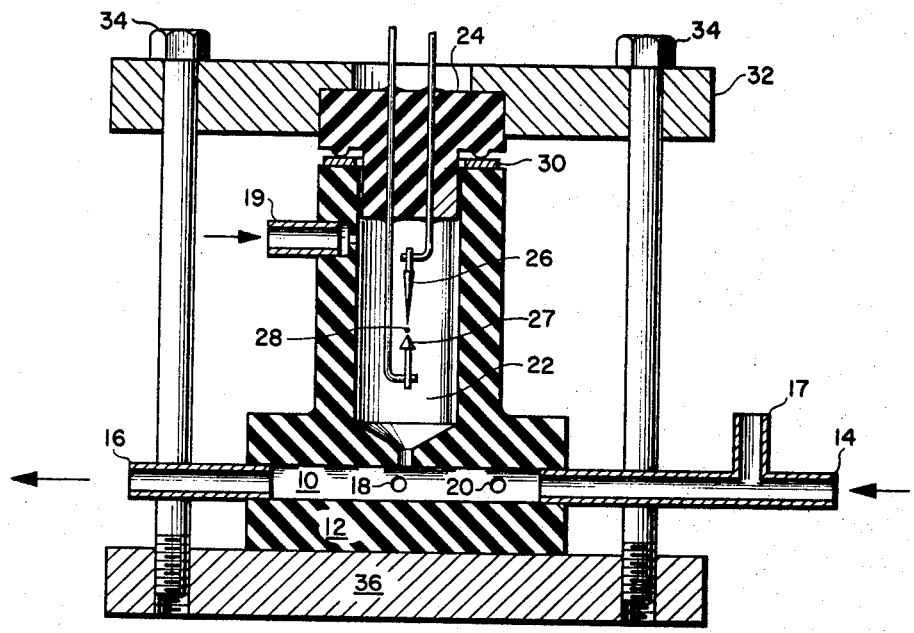

This invention relates generally to detectors for use, for example, in gas chromatography and more specifically to a new and improved detector which with minor modification can be utilized in either the electron capture or photoionization modes.

Electron capture and photoionization detectors have become highly efficient in the detection of certain substances with a high degree of selectivity and great sensitivity. Electron capture detectors are widely used for the detection of electronegative materials such as pesticides and derivatives of steroids and amino acids. Photoionization detectors have been found quite useful in the detection of both organic compounds and the inorganic fixed gases.

An electrical discharge has the capacity of furnishing both electrons, essential to the operation of electron capture detectors, and also photons, essential to the operation of photoionization detectors. In the electron capture detector it is desired to provide a high electron background current and low photon flux. On the other hand, in the photoionization detector it is desirable to suppress the electron current while enhancing the photon flux. The capacity of the electrical discharge to furnish both electrons and photons can be advantageously utilized in furnishing a basic detector which, with only the change of an electrode adapter changing the electrode configuration, can efficiently be utilized in either the electron capture or the photoionization modes. Further, by appropriate construction and choice of operating parameters the undesired effects of the electrons in the photoionization detector and the photons in the electron capture detector may be minimized.

Another problem present in the prior art detectors of both types is the presence of a flow pattern through the detector which does not provide effective sweep-out of the sample in a minimum period of time or a minimized contamination of the discharge chamber by the carrier, sample or photoabsorbing gases. The present detector presents an improved flow pattern which produces a minimum of turbulence, a minimum of dead volume and virtually eliminates possible contamination in the discharge chamber.

Other advantages of the invention will become apparent to those skilled in the art as the invention becomes better understood by reference to the following detailed description and the features of novelty which characterize the invention will be pointed out with particularity in the claims annexed to and forming a part hereof.

Figure 2:
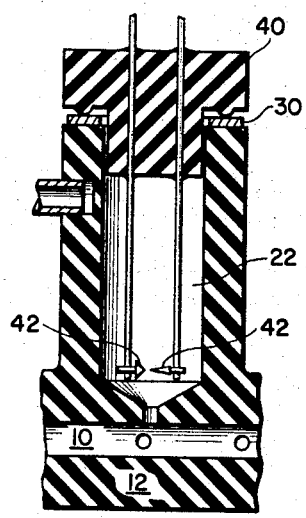

In the drawings:

FIG. 1 is an illustrative preferred embodiment of the detector, in section, with an adapter for use in the electron capture mode; and FIG. 2 is an illustrative embodiment of an adapter, in section, for use with the detector in the photoionization mode.

Referring now to FIG. 1 there is illustrated a detector for use in the electron capture mode having a detector chamber 10 within housing 12 which may be made of any suitable heat and corrosion resistant material such as a hard fired ceramic. The chamber is provided with an inlet tube 14 and an outlet tube 16 for connection in any suitable chromatographic system. Inlet tube 14 may also be provided with a second inlet port or tube 17 for injection of a photoabsorbing gas. A polarizing electrode 18 and a collector electrode 20 are positioned within the detector chamber 10. If the housing is made of a material having high electrical resistance, the electrode may be sealed directly in the housing. Hard fired ceramics generally provide such a high resistance.

A discharge chamber 22 is provided in housing 12 formed generally at right angles to the longitudinal axis or flow axis of detector chamber 10 and intersects the detector chamber, through a restricted area, adjacent the polarizing electrode 18. An inlet tube 19 provides for the introduction of a suitable discharge carrier gas into chamber 22. Outlet tube 16 provides the outlet for the discharge carrier gas. A removable plug 24 closes the end of discharge chamber 22 and carries sealed therein a pair of discharge electrodes consisting of anode 26 and cathode 27 forming a discharge zone 28 therebetween. Plug 24 may also advantageously be constructed of a ceramic material similar to that of detector body or housing 12. Since the discharge electrodes are sealed directly into the plug the plug material must be a good electrical insulator. The areas of the housing 12 and plug 24 in contact with seal 30 may be metallized to provide a good gas seal between the adapter and the housing. Seal 30 is conveniently formed of soft silver, gold or lead. Plug 24 is held in sealed relation with seal 30 and housing 12 by cap 32 encompassing plug 24 and secured by bolts 34 to the base plate 36 adapted to mount the detector in any suitable temperature controlled chamber or "hot-box" of the chromatograph. Since ceramics are generally quite strong in compression, sufficient force may be applied through the cap to seal the metalized surfaces of the plug and the housing with seal 30.

The adapter and discharge electrodes are arranged for advantageous use of the detector in the electron capture mode. It will be noted that the cathode is slightly larger in diameter than the anode and in operation the glowing region of the electrical discharge concentrates around the tip of the cathode. The cathode is disposed between the discharge zone and the intersection of the discharge and detection chambers so that the glowing region faces away from the detection chamber. Although this configuration allows free access of electrons from the discharge to the detection chamber, a minimum of far ultraviolet radiation emitted by the discharge reaches the detection chamber. By proper construction, the cathode 27 casts a shadow over the access port and further minimizes the radiant energy reaching the detector area. With the addition of a photoabsorbing gas at inlet port 17 which will absorb far ultraviolet radiation, the photoionization of the sample gas may be made negligible. Carbon dioxide, propylene, or any other gas which does not appreciably capture electrons and which will absorb far ultraviolet radiation up to wavelengths slightly longer than those corresponding to the ionization potentials of the sample species or other impurities present, may be utilized.

It should be noted that in the illustrated embodiment the detection chamber provides a straight-through flow pattern. It has been the practice in prior art detectors to provide the outlet from the detection chamber generally at right angles to the inlet and to have the discharge chamber located "end-on" to the detection chamber. Such arrangements are shown in my copending application Ser. No. 529,861 filed Feb. 24, 1966, U.S. Patent No. 3,171,028 and by Yamane, "Photoionization Detector for Gas Chromatograph," Journal of Chromatography, vol. 14 (1964), pp. 355–367. These prior art devices have complex flow patterns with ineffective sweep-out of gases from the detection chamber. They are susceptible to turbulence in the areas where the carrier gas and the discharge carrier gas meet, with resultant contamination of the discharge electrodes when photoabsorbing or sample gases diffuse into the discharge chamber. This contamination is particularly troublesome when propylene is utilized as the photoabsorbing gas. The straight-through flow pattern of the carrier gas and right angle flow pattern of the discharge carrier gas in the instant embodiment practically eliminates the contamination problems of the discharge electrodes suffered by the prior art devices when the flow rates are appropriately regulated. The restricted area interconnecting the discharge and detection chamber further aid to prevent back diffusion of the sample carrier gas into the discharge chamber. Because of the low dead volumes and efficient sweep-out of the detection chamber, faster response speeds are also obtained.

In operation of the detector in the electron capture mode a sutable source of electrical energy is connected to the discharge electrodes and a discharge sustaining gas is passed through the discharge chamber under conditions to sustain a stable discharge. The discharge carrier gas may be helium or argon and may contain such gases as oxygen, nitrogen, air, hydrogen, nitrous oxide or carbon dioxide in sufficient quantities to stabilize the discharge and lower the energy thereof. The volume flow rate of the discharge carrier gas is set sufficiently high to limit back diffusion of the sample carrier and sample gases into the discharge chamber. In some instances this flow rate may be even lower than the sample carrier gas flow rate through the detection chamber. Sample carrier gas is introduced at the detector chamber inlet port and a suitable photoabsorbing gas such as carbon dioxide at the second inlet port. Typical flow rates for the discharge carrier gas and the sample carrier gas are 60 cc. per minute and 40 cc. per minute respectively for 1/8-inch packed columns. The general procedure for setting the voltages on the polarizing and collector electrodes and for setting the quantity of photoabsorbing gas added to the sample carrier gas are similar to those disclosed in my aforementioned copending application Ser. No. 529,861. The voltage across discharge electrodes 26 and 27 is set to provide a fixed current and the voltage on the polarizing electrode 18 to give a peak background current at collector electrode 20. It is generally desirable to place one of the discharge electrodes at ground and bias the other at a minus potential with respect thereto. The amount of photoabsorbing gas may be determined by gradually increasing the amount thereof until a maximum background current is reached. In the foregoing example where flow rates of 60 cc. per minute and 40 cc. per minute were utilized for the discharge carrier and sample carrier gases respectively with a 1/8-inch packed column, approximately 1–3 cc. per minute of carbon dioxide was found most suitable. It may be desirable to reselect or adjust the potential on the polarizing electrode after the amount of photoabsorbing gas has been selected to again reset the maximum background current. In the foregoing example, which typifies conditions employed for the measurement of strongly capturing substances, the discharge anode is set at ground potential and the cathode biased at —200 volts with a discharge carrier gas of helium. The collector electrode is grounded and the polarizing electrode biased at —60 to —100 volts.

It should be understood that the biasing potentials are somewhat dependent upon the sample to be detected and may range from substantially below peak background current for weak capturing samples too close to or even slightly above the peak background current for strong capturing substances, particularly if it is desirable to discriminate between strongly and weakly capturing samples. Thus when weakly capturing substances are to be measured, a higher $CO_2$ flow (5–7 cc./min.) provides better sensitivity in combination with a polarizing voltage towards the lower end of the above cited range. With a detector constructed according to the foregoing teaching a detection sensitivity in the sub-pico gram level has been attained for strongly capturing samples. For example, a detection limit of less than $10^{-14}$ grams/cc. has been reached for $\gamma$-benzene hexachloride.

Referring now to FIG. 2 there is illustrated a second removable plug 40 having a pair of discharge electrodes 42 sealed therein which are arranged to particularly adapt the detector for utilization in the photoionization mode. The plug and electrodes are shown in relation to only a part of housing 12 and discharge chamber 22 to indicate their relative orientation. It is to be understood that the remaining portions of the detector are similar to those illustrated in FIG. 1, and common reference numerals have been utilized for common parts throughout the two figures.

It will be noted that the essential distinction between the discharge electrodes in the embodiment of FIG. 2 is that when the detector is utilized in the photoionization mode the electrodes are arranged such that the discharge zone is directly exposed to the detection chamber. The electrodes are also located closer to the hole connecting the discharge and detection chambers. In this way maximum far ultraviolet energy from the discharge is directed toward the detection chamber.

In operation of the detector in the photoionization mode again a suitable source of electrical energy is connected to the discharge electrodes and a discharge sustaining gas is passed through the discharge chamber under conditions to sustain a stable discharge. The discharge carrier gas again is normally helium or argon. Other discharge carrier gases such as nitrogen or hydrogen may be used so long as they do not reabsorb the far ultraviolet radiation capable of ionizing sample. As in the case of the electron capture detector the volume flow rate of the discharge carrier gas is desirably set sufficiently high to prevent back-diffusion of the sample carrier gas into the discharge chamber. In the photoionization detector the photoabsorbing gas is, of course, omitted from the sample carrier gas and the second inlet is closed off or may be omitted entirely. In the photoionization mode, however, the polarizing electrode is generally made effectively more negative than the discharge electrodes in order that electrons are repelled from the junction of the discharge chamber and the detection chamber to minimize the electron capture phenomena and the background current. The collector electrode is made positive with respect to the polarizing electrode. In practice, typical potentials are from —50 to —150 volts at the polarizing electrode with the collector electrode grounded and the discharge cathode at —200 volts and the anode grounded. The —200 volts placed on the cathode of the discharge electrodes results in an effective average potential of about −100 volts across the electrodes, leaving the polarizing electrode more negative than the effective discharge voltage (when the polarizing electrode is biased at −150 volts) thus tending to repel electrons from the detection chamber.

When operating in the photoionization mode it is necessary to maintain the potential gradient between the polarizing and collector electrodes greater than 0.05 volt per centimeter per millimeter of mercury pressure therebetween and for maximum efficiency it is desirable to maintain the gradient less than 0.7 volt/cm./mm./Hg.

The sample carrier gas is not critical but is usually helium or argon. Nitrogen, air, water-vapor or hydrogen could be used. It is only desirable that the carrier gas be inert with respect to the sample and that it have an ionization potential above that of the sample to be detected. Typical flow rates for the detector in the photoionization mode with ⅛-inch packed columns are 60 cc./min. discharge carrier flow and 40 cc./min. sample carrier flow.

It has been indicated that any suitable temperature and corrosion resistant material having a high electrical resistance is suitable for the detector housing. Particularly, U.S. Stoneware's 96% alumina hard-fired ceramic has been found suitable. The electrode material is not critical but should be corrosion and heat resistant. Platinum has been found suitable for use as the discharge electrode material and nickel for the polarizing and collector electrode materials. It should also be noted that the polarizing and collector electrodes are in the form of pins rather than screens as has been the practice in the prior art. This has the advantage that these electrodes can be directly sealed into the ceramic body in a leak-tight fired metal-ceramic seal, avoiding possible introduction of contaminants and time-consuming fabrication procedures required if electrode members must be attached after the feed through seals are fabricated as has been the case with screen-type electrodes.

In each of the embodiments, the use of the removable discharge electrode adapter allows the electrodes to be precisely positioned and aligned prior to insertion in the chamber. This greatly facilitates construction and allows maximum efficiency and longer electrode life to be realized from the detector.

The the T-shape construction if is possible to place the detection chamber portion of the detector in a temperature controlled environment allowing the adapter to protrude therefrom. This is important in that the use of electrical discharge as the source of electrons has the advantage over radioactive sources since the detector can be operated at a much higher temperature. With the T configuration the gas seal between the metallized portions of the adapter and housing may be made outside the "hot box." This allows the use of soft gasket material having low melting points, for example, lead, which greatly reduces the cost of construction and the loading required for leak-tight sealing as compared with gold and soft silver seals. In this cooler zone, lead has been found completely suitable while operating the detector at temperatures in the region of 500° C. Most radioactive source type detectors have an upper operating range in the region of 200–300° C.

There has been illustrated and described a detector which, by merely changing the adapter, can be utilized efficiently in either the photoionization or electron capture modes. The detector, utilizing pins rather than screens as the polarizing and collector electrodes allows a smaller construction of the detection chamber thereby requiring less sweep-out time and a more desirable flow pattern. The detector also is easier to fabricate and less subject to contamination and leakage.

The T-shaped construction, with the sample carrier gas flow being straight through the detector and the discharge carrier gas flow inlet and outlet being at right angles provides a minimum of turbulence and contamination of the discharge electrodes. With the adapter the discharge electrodes may be prealigned and spaced during manufacture.

The right angle intersection of the chambers is not critical and the discharge chamber may lie at an angle with respect to the detection chamber. It is desirable however that the intersection be closely adjacent the polarizing electrode and preferably it should be just upstream of the polarizing electrode. In the preferred embodiment, the axis of the discharge chamber lies along the upstream edge of the electrode.

While the invention has been described in connection with the two illustrated preferred embodiments it is to be understood that many variations and modifications thereof are possible and will be obvious to those skilled in the art in light of the teachings herein contained without departing from the spirit and scope of the appended claims.

What is claimed is:

1. A detector for use in a gas chromatograph comprising:
   a housing having a discharge chamber and a detection chamber formed therein, said discharge chamber being disposed at an angle to said detection chamber and intersecting said detection chamber intermediate the ends thereof through a restriction;
   a polarizing electrode and a collector electrode secured within said housing and extending into said detection chamber, each of said electrodes adapted to be connected to a source of electrical potential;
   means for admitting a carrier gas containing a sample into said detection chamber for flow past said collector electrode and said polarizing electrode;
   a removable adapter closing one end of said discharge chamber and carrying a pair of discharge electrodes forming a discharge zone therebetween whereby said electrodes may be positioned in said discharge chamber;
   means for securing said adapter in sealed relation with said housing;
   means for admitting a discharge carrier gas into said discharge chamber for flow past said discharge electrodes and into said detection chamber; and
   means for exhausting said carrier gas and said discharge carrier gas from said detection chamber.

2. A detector according to claim 1 wherein said discharge electrodes comprise an anode and a cathode forming a discharge zone therebetween and said cathode is positioned intermediate said discharge zone and the intersection of said detection and discharge chambers.

3. The detector according to claim 1 wherein said discharge electrodes comprise an anode and a cathode forming a discharge zone therebetween, said discharge zone being exposed to the intersection of said discharge and detection chambers.

4. A detector for a chromatograph according to claim 1 in which said discharge chamber is disposed at substantially right angles to said detection chamber.

5. The detector according to claim 1 wherein said means for admitting a carrier gas containing a sample into said detection chamber further includes means for admitting a photoabsorbing gas for absorbing any photons entering said detection chamber from said discharge chamber.

6. A detector according to claim 1 wherein said housing is formed of a ceramic material and said electrode is fused in said housing by a metal-to-ceramic seal.

7. A detector according to claim 1 wherein said housing and said adapter are formed of a ceramic material and said polarizing and collector electrodes are fused in said housing by a metal-to-ceramic seal.

8. A detector according to claim 1 wherein said inlet and outlet means are disposed at opposite ends of a substantially straight detection chamber to provide an unimpeded flow pattern through said chamber.

References Cited

UNITED STATES PATENTS

| | | | |
|---|---|---|---|
| 3,087,113 | 4/1963 | Foster | 250—83.6 X |
| 3,134,898 | 5/1964 | Burnell et al. | 250—83.6 X |
| 3,171,028 | 2/1965 | Lovelock | 250—83.6 |
| 3,238,367 | 3/1966 | Sternberg et al. | 250—43.5 |

JAMES W. LAWRENCE, *Primary Examiner.*

R. L. JUDD, *Assistant Examiner.*

U.S. Cl. X.R.

250—43.5, 23.1; 88—14